US012639305B2

(12) United States Patent
Haprian et al.

(10) Patent No.: US 12,639,305 B2
(45) Date of Patent: May 26, 2026

(54) METHOD FOR SHARING LANDMARKS FOR FAST PROCESSING OF TOP K CHEAPEST PATH QUERIES

(71) Applicant: Oracle International Corporation, Redwood Shores, CA (US)

(72) Inventors: Vlad Haprian, Zurich (CH); Oskar Van Rest, Mountain View, CA (US); Sungpack Hong, Palo Alto, CA (US); Hassan Chafi, San Mateo, CA (US); Bence Czipo, Schlieren (CH)

(73) Assignee: Oracle International Corporation, Redwood Shores, CA (US)

( * ) Notice: Subject to any disclaimer, the term of this patent is extended or adjusted under 35 U.S.C. 154(b) by 237 days.

(21) Appl. No.: 16/734,035

(22) Filed: Jan. 3, 2020

(65) Prior Publication Data

US 2021/0209108 A1     Jul. 8, 2021

(51) Int. Cl.
*G06F 16/2453*     (2019.01)
*G06F 16/22*     (2019.01)

(52) U.S. Cl.
CPC .... *G06F 16/24542* (2019.01); *G06F 16/2264* (2019.01)

(58) Field of Classification Search
CPC ...................... G06F 16/24542; G06F 16/2264
See application file for complete search history.

(56) References Cited

U.S. PATENT DOCUMENTS

| | | | |
|---|---|---|---|
| 7,069,530 B1 * | 6/2006 | Teig ...................... | G06F 30/394 |
| | | | 716/134 |
| 9,135,565 B1 * | 9/2015 | Khalefa .............. | G06F 16/2365 |
| 2003/0070153 A1 * | 4/2003 | Stevens ................. | G06F 30/394 |
| | | | 716/126 |
| 2006/0047421 A1 * | 3/2006 | Goldberg .............. | H04L 45/122 |
| | | | 701/533 |
| 2008/0155119 A1 * | 6/2008 | Imamura ................. | H04L 45/00 |
| | | | 709/241 |

(Continued)

FOREIGN PATENT DOCUMENTS

CN          111611442          9/2020

OTHER PUBLICATIONS

Aljazzar et al., "K*: A heuristic search algorithm for finding the k shortest paths," Aug. 5, 2011, Artificial Intelligence 175 (2011), pp. 2129-2154.*

(Continued)

*Primary Examiner* — Jensen Hu
(74) *Attorney, Agent, or Firm* — Hickman Becker Bingham Ledesma LLP

(57)          ABSTRACT

Herein are techniques to accelerate finding a top few shortest paths between two vertices of a graph. In an embodiment, a computer calculates, for a graph that contains vertices that include landmark vertices, distances between each vertex and each landmark vertex. Based on the distances from each vertex to each landmark vertex, a top few shortest paths from a source vertex to a target vertex are calculated. In an embodiment, triangulation establishes a lower bound on a distance from a neighbor vertex of a current vertex to a target vertex of a query. In an embodiment, distance predictions based on the distance lower bounds are used to accelerate a K-A star search for the top few shortest paths.

21 Claims, 11 Drawing Sheets

(56) References Cited

U.S. PATENT DOCUMENTS

| 2009/0040931 | A1* | 2/2009 | Bast | G01C 21/3446 |
| | | | | 370/238 |
| 2010/0262574 | A1 | 10/2010 | Zhou | |
| 2010/0268447 | A1* | 10/2010 | Griffiths | G01C 21/3423 |
| | | | | 701/532 |
| 2010/0306216 | A1* | 12/2010 | Andersen | G06F 16/9024 |
| | | | | 707/769 |
| 2011/0173189 | A1 | 7/2011 | Singh | |
| 2012/0158639 | A1* | 6/2012 | Moore | G06F 16/282 |
| | | | | 706/55 |
| 2014/0137130 | A1 | 5/2014 | Jacob | |
| 2014/0172914 | A1 | 6/2014 | Elnikety | |
| 2014/0244687 | A1 | 8/2014 | Shmueli | |
| 2015/0006316 | A1 | 1/2015 | Zhou | |
| 2015/0112986 | A1 | 4/2015 | Jin | |
| 2016/0313133 | A1* | 10/2016 | Zeng | B60W 60/001 |
| 2016/0364794 | A1* | 12/2016 | Chari | G06Q 40/02 |
| 2017/0060958 | A1* | 3/2017 | Van Rest | G06F 16/9024 |

OTHER PUBLICATIONS

Goldberg et al., "Reach for A*: Efficient point-to-point shortest path algorithms". In: 2006 Proceedings of the Eighth Workshop on Algorithm Engineering and Experiments (ALENEX), pp. 129-143, 2006.*

Liu et al, Finding Top-k shortest Paths with Diversity, IEEE Transactions on Knowledge and Data Engineering, pp. 488-502, vol. 30, Issue: 3, Mar. 1, 2018 (hereinafter Liu).*

Goldberg et al., Computing the Shortest Path: A* Search Meets Graph Theory, Mar. 2003, Microsoft Research, MSR-TR-2004-24.*

Maue et al., Goal-Directed Shortest-Path Queries Using Precompted Cluster Distances, AMC Journal of Experimental Algorithms, vol. 14, Article No. 3.2, Jul. 2009.*

Rest, U.S. Appl. No. 14/837,696, filed Aug. 27, 2015, Advisory Action, Oct. 16, 2018.

Rest, U.S. Appl. No. 14/837,696, filed Aug. 27, 2015, Office Action, Oct. 18, 2017.

Rest, U.S. Appl. No. 14/837,696, filed Aug. 27, 2015, Office Action, Apr. 4, 2019.

Rest, U.S. Appl. No. 14/837,696, filed Aug. 27, 2015, Final Office Action, Oct. 21, 2019.

Rest U.S. Appl. No. 14/837,696, filed Aug. 27, 2018, Final Office Action, Jun. 13, 2018.

Shaffer, Clifford, "CS 5114: Theory of Algorithms", dated 2014, 9 pages.

Yildirim et al., "GRAIL: Scalable Reachability Index for Large Graphs", Proceedings of the VLDB Endowment, vol. 3, No. 1 Copyright 2010 VLDB Endowment 21508097, 9 pages.

Tretyakov et al., "Fast Fully Dynamic Landmark-based Estimation of Shortest Path Distances in Very Large Graphs", CIKM dated Oct. 24-28, 2011, 10 pages.

Sommer, Christian, Shortest-Path Queries in Static Networks, ACM Computing Surveys, vol. V No. N, dated Sep. 2013, 35 pages.

Queiros et al., "A New Shortest Paths Ranking Algorithm", dated Jul. 1999, 15 pages.

Potamias et al., "Fast Shortest Path Distance Estimation in Large Networks", dated Mar. 9, 2009, 13 pages.

Jimenez et al., "Computing the K Shortest Paths: A New Algorithm and Experimental Comparision", WAE dated 1999, 15 pages.

Jimenez et al., "A Lazy Version of Eppstein's K Shortest Paths Algorithm", dated 2003, 13 pages.

Grant et al., "LPI Approximating Shortest Paths Using Landmarks", dated 2008, 5 pages.

Goldberg et al., "Computing the Shortest Path: A Search Meets Graph Theory", dated Mar. 2004, 26 pages.

Fushs, Fabian, "On Preprocessing the ALT-Algorithm", dated Mar. 22, 2010, 48 pages.

Floreskul et al., "Memory-Efficient Fast Shortest Path Estimation in Large Social Networks", Eighth International AAAI Conference on Weblogs and Social Media, dated 2014, 10 pages.

Eppstein, David, "Finding the K Shortest Paths", Tech Report 94-26, dated May 31, 1994, 23 pages.

Rest, U.S. Appl. No. 14/837,696, filed Aug. 27, 2015, Notice of Allowance, Jul. 23, 2020.

Rest U.S. Appl. No. 14/837,696, filed Aug. 27, 2015, Office Action, Apr. 17, 2020.

The International Searching Authority, "Search Report" in Application No. PCT/US2020/067325, dated Apr. 16, 2021, 16 pages.

Liu, Huiping, et al., "Finding Top-K Shortest Paths with Diversity", IEEE Trans. On Knowledge and Data Engineering, vol. 30, issue No. 3, Mar. 1, 2018, 16pgs.

Goldberg, Andrew, V., et al., "Computing Point-to-Point Shortest Paths from External Memory", Proceedings of the 7th Workshop on Algorithm Engineering and Experiments and the 2nd workshop on Analytic Algorithms and Combinatorics, Jan. 22, 2005, 16pgs.

Chang, Lijun, et al., "Efficiently Computing Top-K Shortest Path", Proc. 18th Intl Conf on EDBT, Mar. 23, 2015, 12pgs.

Alijazzar, Husain, et al., "K*: A Heuristic Algorithm for finding the k shortest paths", Artificial Intell, Elsevier Science, vol. 175, issue No. 18, pp. 2129-2154, Jul. 14, 2011, 26pgs.

* cited by examiner

COMPUTER 100

| GREEDY PATH | SOLUTION DISTANCES 130 |
|---|---|
| I-A-C | 3 |
| I-A-F-C | 3.1 |
| I-A-F-G-C | 2.5 |
| I-A-E-F-G-C | 3.5 |
| I-A-E-F-C | 4.1 |
| I-A-B-G-C | 1.9 |
| I-A-G-C | 2.4 |

LANDMARK DISTANCES 120

| VERTEX | TO LANDMARK F | FROM LANDMARK F | TO LANDMARK G | FROM LANDMARK G | TO LANDMARK J | FROM LANDMARK J |
|---|---|---|---|---|---|---|
| A | 0.1 | 0.1 | 0.5 | 1 | 1.01 | |
| B | 0.3 | 0.3 | 0.3 | 1.2 | 1.21 | |
| C | 1.5 | 1 | 0.4 | 0.4 | 2.41 | |
| D | | | | | | |
| E | 1 | 0.2 | 1.6 | 1.1 | 2.11 | |
| F | 0 | 0 | 0.6 | 1.1 | 1.11 | |
| G | 1.1 | 0.6 | 0 | 0 | 1.31 | |
| H | | | | | | |
| I | 1.1 | 1.1 | 1.5 | 1.01 | 1 | 0.01 |
| J | | 0.12 | | 2 | 2.01 | |
| | | | | 1.02 | 0 | 0 |

GRAPH 110

PRUNING 200

| NEIGHBOR OF CURRENT A | LANDMARK | PRUNING RULE 1 (YES, NO) = PRUNE | | PRUNING RULE 2 (YES, NO) = PRUNE | | RESULT |
|---|---|---|---|---|---|---|
| | | LANDMARK TO NEIGHBOR | LANDMARK TO TARGET C | TARGET C TO LANDMARK | NEIGHBOR TO LANDMARK | |
| B | F | | YES | | YES | |
| B | G | | YES | | YES | |
| B | J | NO | | | YES | |
| C | F | | YES | | YES | |
| C | G | | YES | | YES | |
| C | J | NO | | | YES | |
| E | F | | YES | | YES | |
| E | G | | YES | | YES | |
| E | J | NO | | | YES | |
| G | F | | YES | | YES | |
| G | G | | YES | | YES | |
| G | J | NO | | | YES | |
| H | F | | YES | YES | NO | PRUNE |
| H | J | YES | NO | | | PRUNE |

FIG. 2

TRIANGULATIONS 300

| LANDMARK DISTANCES 120-ii | | |
|---|---|---|
| FROM VERTEX | | TO LANDMARK G |
| | B | 0.3 |
| | C | 0.4 |
| d(B,G) - d(C,G) | | NEGATIVE |

| LANDMARK DISTANCES 120-i | | |
|---|---|---|
| TO VERTEX | | FROM LANDMARK F |
| | B | 0.3 |
| | C | 1 |
| d(F,C) - d(F,B) | | 0.7 |

TRIANGULATIONS 400

| NEIGHBOR | LANDMARK | T: LANDMARK TO TARGET C | U: LANDMARK TO NEIGHBOR | V: NEIGHBOR TO LANDMARK | W: TARGET C TO LANDMARK | LOWER BOUND X: T - U | LOWER BOUND Y: V - W | EDGE LENGTH Z | MAX LOWER BOUND |
|---|---|---|---|---|---|---|---|---|---|
| B | F | 1 | 0.3 | 0.3 | 1.5 | 0.7 | NEGATIVE | | 0.7 |
| B | G | 0.4 | 1.2 | 0.3 | 0.4 | NEGATIVE | NEGATIVE | | |
| B | J | NO | NO | 1.21 | 2.41 | | NEGATIVE | | |
| C | | | | | | | | 2 | 0 EXACT |
| E | F | 1 | 0.2 | 1 | 1.5 | 0.8 | NEGATIVE | | 0.8 |
| E | G | 0.4 | 1.1 | 1.6 | 0.4 | NEGATIVE | 1.2 | | 1.2 |
| F | F | 1 | 0 | 0 | 1.5 | 1 | NEGATIVE | | 1 EXACT |
| F | G | 0.4 | 1.1 | 0.6 | 0.4 | NEGATIVE | 0.2 | | 0.2 |
| G | G | 0.4 | | | | | | 1 | 0.4 EXACT |
| A | F | 1 | 0.1 | 0.1 | 1.5 | 0.9 | NEGATIVE | | 0.9 |
| I | G | 0.4 | 2 | 1.5 | 0.4 | NEGATIVE | 1.1 | | 1.1 |

LANDMARK DISTANCES 120-iii

| VERTEX | TO LANDMARK F | FROM LANDMARK F | TO LANDMARK G | FROM LANDMARK G | TO LANDMARK J | FROM LANDMARK J |
|---|---|---|---|---|---|---|
| A | 0.1 | 0.1 | 0.5 | 1 | 1.01 | |
| B | 0.3 | 0.3 | 0.3 | 1.2 | 1.21 | |
| C | 1.5 | 1 | 0.4 | 0.4 | 2.41 | |
| E | 1 | 0.2 | 1.6 | 1.1 | 2.11 | |
| F | 0 | 0 | 0.6 | 1.1 | 1.11 | |
| G | 1.1 | 0.6 | 0 | 0 | 1.31 | |
| I | 1.1 | 1.1 | 1.5 | 2 | 2.01 | |

FIG. 4

A STAR SEARCH 500

ITERATION 2

| NEIGHBOR | MAX LOWER BOUND |
|---|---|
| B | 0.7 |
| C | 0 |
| E | 1.2 |
| F | 1 |
| G | 0.4 |

PRIORITY QUEUE 510

| PATH | PREDICTED DISTANCE | ITERATION | | |
|---|---|---|---|---|
| | | ADDED | REMOVED | FOUND |
| I | 0 + 1.1 = 1.1 | 0 | 1 | |
| I-A | 1 + 0.9 = 1.9 | 1 | 2 | |
| I-A-B | 1.2 + 0.7 = 1.9 | 2 | 3 | |
| I-A-B-G | 1.5 + 0.4 = 1.9 | 3 | 4 | |
| I-A-B-G-C | 1.9 | | | 4 |
| I-A-F | 1.1 + 1 = 2.1 | 2 | 5 | |
| I-A-E | 1.1 + 1.2 = 2.3 | 2 | 6 | |
| I-A-G | 2 + 0.4 = 2.4 | 2 | 7 | |
| I-A-G-C | 2.4 | | | 7 |
| I-A-F-G | 2.1 + 0.4 = 2.5 | 5 | | |
| I-A-F-G-C | 2.5 | | | 2 |
| I-A-C | 3 | | | 2 |
| I-A-F-C | 3.1 | | | 5 |
| I-A-E-F | 2.1 + 1 = 3.1 | 6 | | |

602 Calculate distances between each graph vertex and each landmark vertex

604 Based on landmark distances, calculate top K shortest paths from source vertex to target vertex

FIG. 7

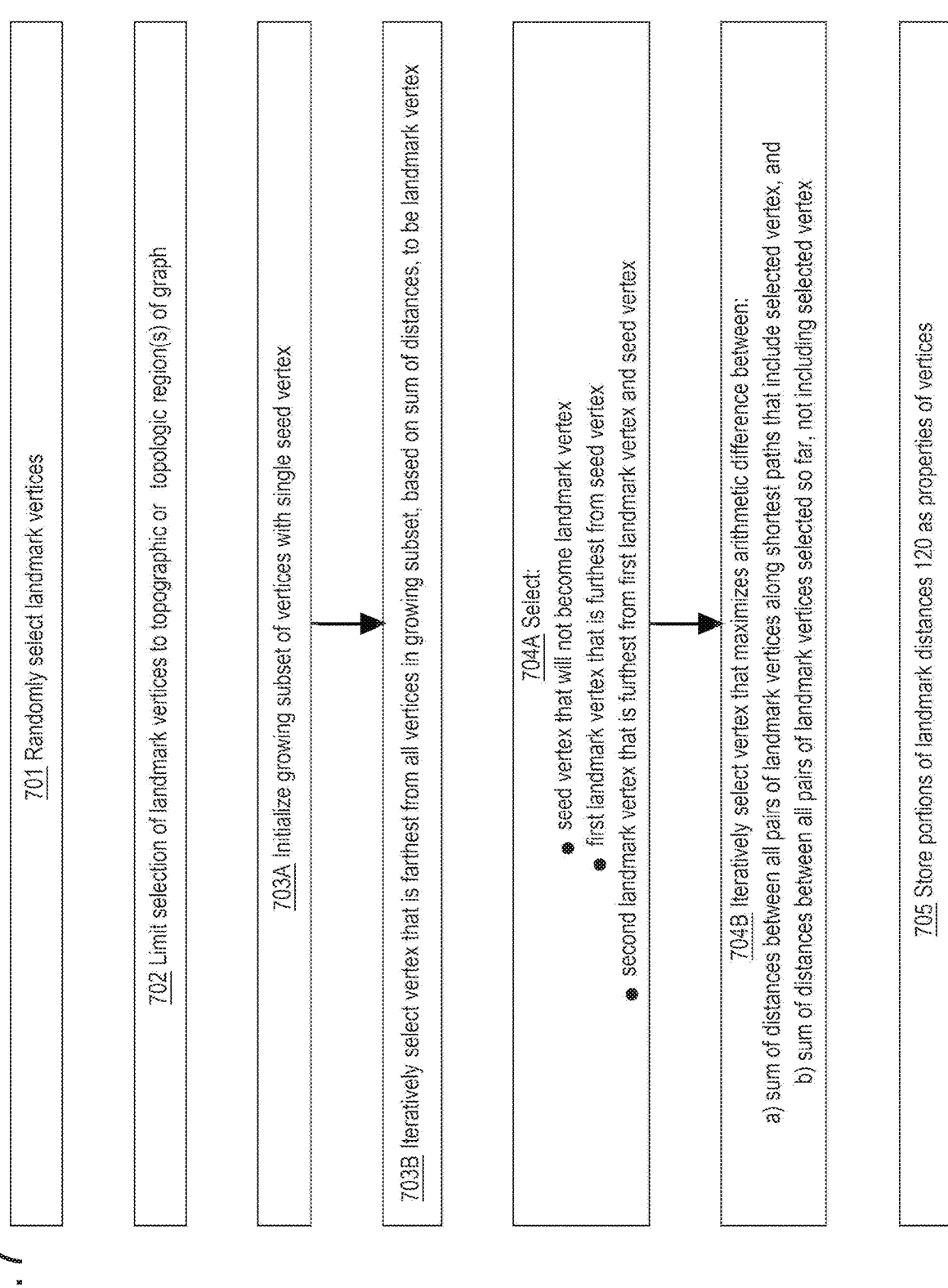

701 Randomly select landmark vertices

702 Limit selection of landmark vertices to topographic or topologic region(s) of graph 703A initialize growing subset of vertices with single seed vertex 703B Iteratively select vertex that is farthest from all vertices in growing subset, based on sum of distances, to be landmark vertex 704A Select:
- seed vertex that will not become landmark vertex
- first landmark vertex that is furthest from seed vertex
- second landmark vertex that is furthest from first landmark vertex and seed vertex 704B Iteratively select vertex that maximizes arithmetic difference between:
a) sum of distances between all pairs of landmark vertices along shortest paths that include selected vertex, and
b) sum of distances between all pairs of landmark vertices selected so far, not including selected vertex 705 Store portions of landmark distances 120 as properties of vertices

FIG. 8

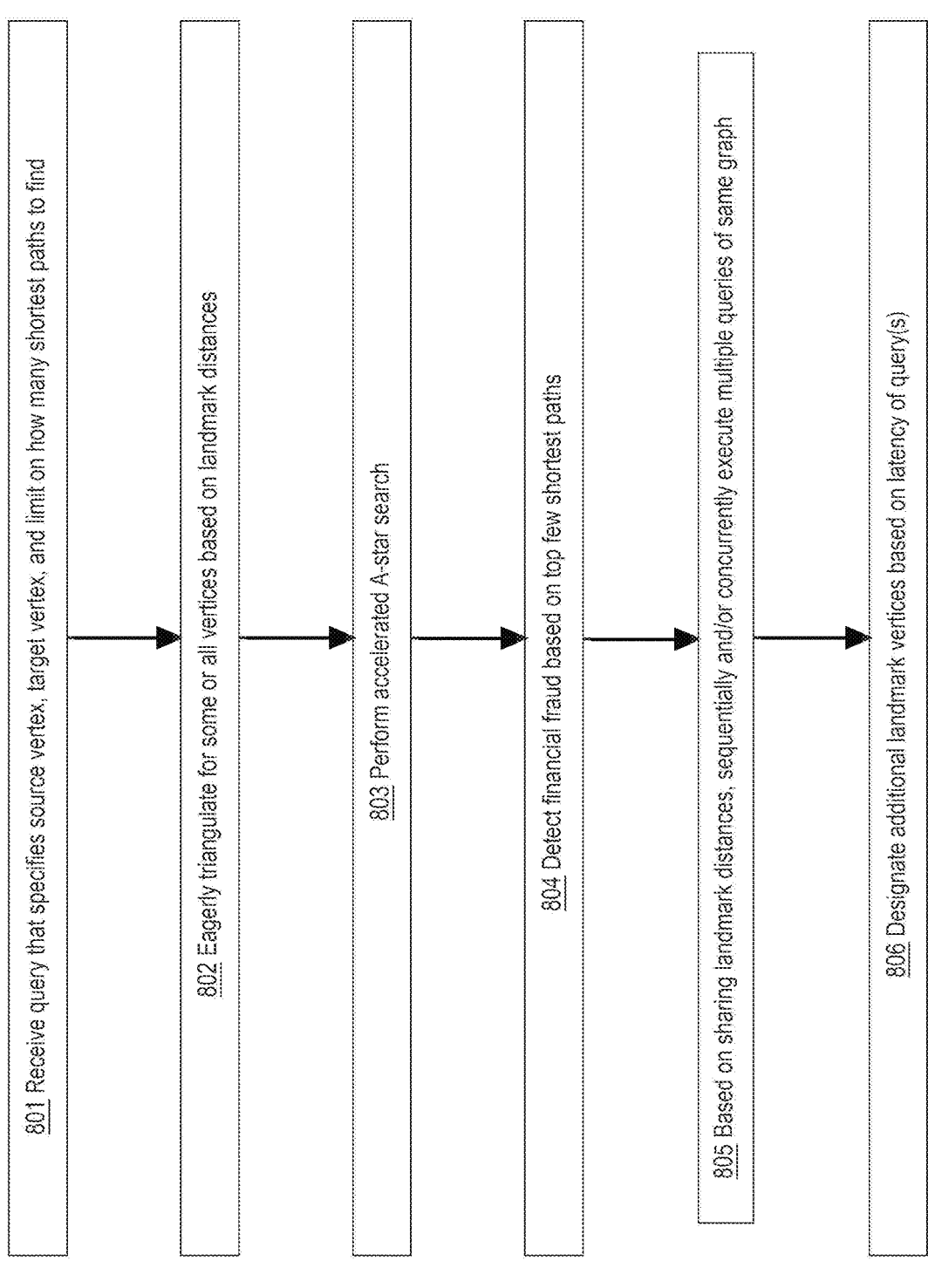

801 Receive query that specifies source vertex, target vertex, and limit on how many shortest paths to find 802 Eagerly triangulate for some or all vertices based on landmark distances 803 Perform accelerated A-star search 804 Detect financial fraud based on top few shortest paths 805 Based on sharing landmark distances, sequentially and/or concurrently execute multiple queries of same graph 806 Designate additional landmark vertices based on latency of query(s)

FIG. 9

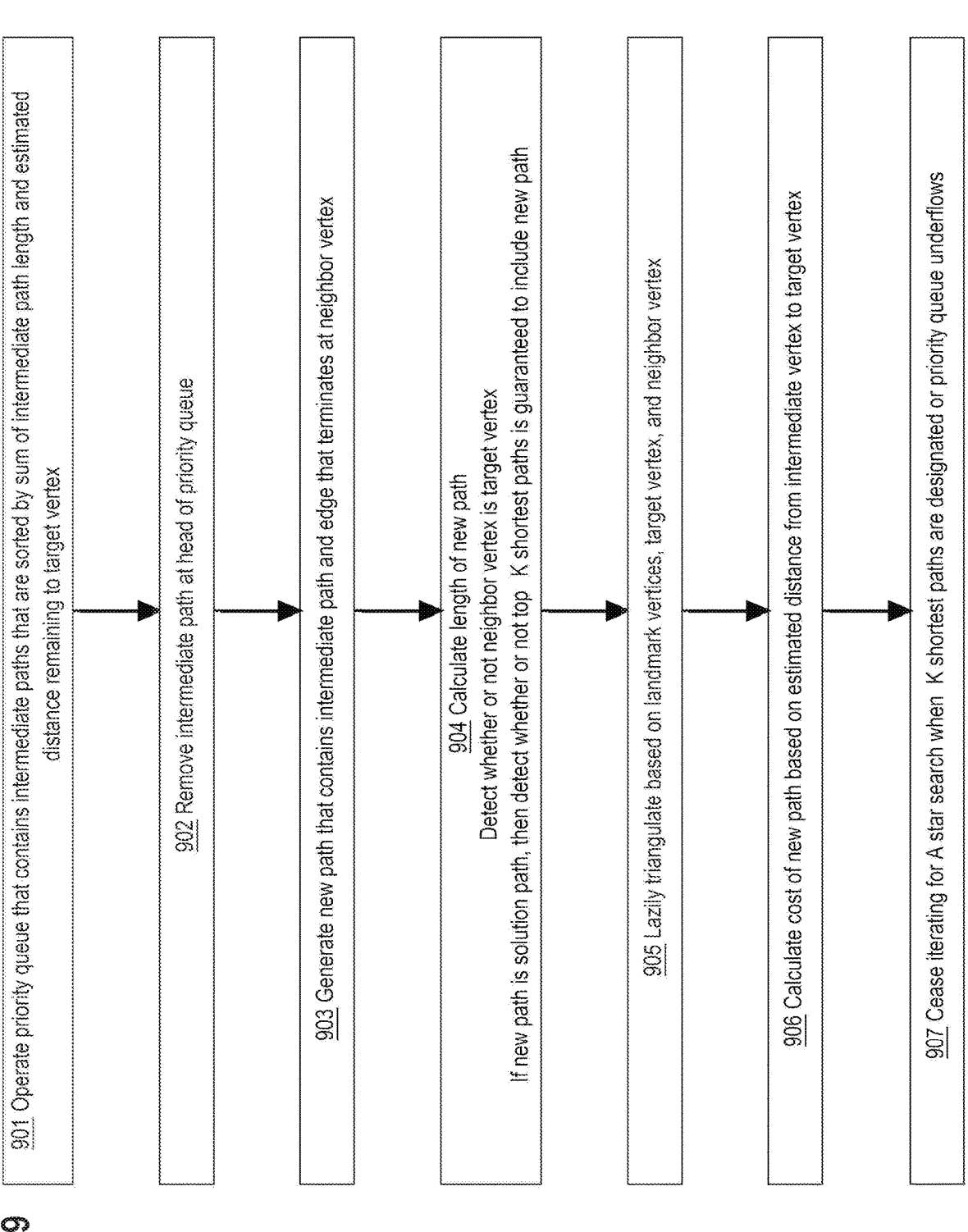

901 Operate priority queue that contains intermediate paths that are sorted by sum of intermediate path length and estimated distance remaining to target vertex 902 Remove intermediate path at head of priority queue 903 Generate new path that contains intermediate path and edge that terminates at neighbor vertex 904 Calculate length of new path Detect whether or not neighbor vertex is target vertex If new path is solution path, then detect whether or not top K shortest paths is guaranteed to include new path 905 Lazily triangulate based on landmark vertices, target vertex, and neighbor vertex 906 Calculate cost of new path based on estimated distance from intermediate vertex to target vertex 907 Cease iterating for A star search when K shortest paths are designated or priority queue underflows

SOFTWARE SYSTEM 1100

APPLICATION PROGRAM 1 — 1102A

APPLICATION PROGRAM 2 — 1102B

APPLICATION PROGRAM 3 — 1102C

[...]

APPLICATION PROGRAM N — 1102N

1102

OPERATING SYSTEM (e.g., WINDOWS, UNIX, LINUX, MAC OS, IOS, ANDROID, OR LIKE) — 1110

GRAPHICAL USER INTERFACE (GUI) — 1115

VIRTUAL MACHINE MONITOR (VMM) — 1130

BARE HARDWARE (e.g., COMPUTING DEVICE 1000)

METHOD FOR SHARING LANDMARKS FOR FAST PROCESSING OF TOP K CHEAPEST PATH QUERIES

FIELD OF THE INVENTION

The present invention relates to graph path search. Herein are techniques that triangulate based on landmark vertices to accelerate searching for a few shortest paths between a source vertex and a target vertex.

BACKGROUND

A logical graph is an important data model that captures relationships between data entities. Many applications in various practical domains may utilize a graph model for data analysis and querying. During the past few years, the amount of interrelated data available for processing has increased exponentially. In many or most cases, much valuable information is hidden in the relationships between data entities. Graph query engines aim to exploit these relationships by providing a fast and scalable way of executing graph queries on the existing raw data.

In the database industry, graph databases are an emerging area that is growing quickly and drawing attention. A graph database is a special kind of database with an underlying dataset that is modeled as a graph. Graph database products typically support path queries as an important feature for graph analytics to reveal connections between distant pieces of a graph. However, graph databases may have scalability problems that cause some path queries to slowly execute, especially because path finding typically has exponential computational complexity.

A path query is a special kind of query for graph databases. A path query may ask to find some or all possible paths between a source vertex and a target vertex. The result of the path query is a set of result paths. Each result path may have a sequence of vertices and edges.

Oracle Spatial and Oracle Graph products support graph data models which may benefit from path query acceleration. Path queries in existing graph databases have given rise to some observations. The graph data in graph databases can be voluminous and involve millions of vertices and billions of edges. Even small graphs may potentially have an exponential number of paths between two vertices.

In practice, typical queries include enough constraints to limit retrieved result paths to a small amount. Nevertheless, methodologies used in existing graph databases, often need excessive execution time even when the amount of result paths is small.

Out of a large spectrum of possible graph queries, there is much interest in top k cheapest path queries, which are queries that retrieve the first k few cheapest paths between a given source vertex and a given destination vertex, such as according to a cost function.

State of the art approaches that answer top k cheapest path queries typically rely upon building a shortest path tree (SPT) that is specific to a given destination vertex. That implies computing, for every vertex in the graph, the shortest path to the given destination vertex. The first cheapest path will be the one generated in the SPT for the given source. The next cheapest paths are computed by diverging from the SPT and taking the paths with the minimum cost. Such an algorithm represents the primary mechanism behind existing algorithms such as the Martins-Santos algorithm, Eppstein's algorithm, the lazy algorithm of Jiménez and Marzal, and the recursive enumerating algorithm.

In the context of a multi-user graph database system, answering top-k cheapest path queries quickly is even more challenging, especially with a huge graph and many concurrent users. For example, every query may build an SPT for every given source/destination pair of vertices, which may be extremely slow and/or memory intensive.

BRIEF DESCRIPTION OF THE DRAWINGS

In the drawings:

FIG. 2 is a block diagram that depicts an example pruning that entails applying pruning rules that use landmark distances to prune dead end vertices;

FIG. 4 is a block diagram that depicts example triangulations to calculate accurate lower bounds based on all landmark vertices for a given neighbor vertex;

FIG. 7 is a flow diagram that depicts an example process for designating landmark vertices from which all distances needed for triangulation may be calculated;

FIG. 8 is a flow diagram that depicts example query processing;

FIG. 9 is a flow diagram that depicts example processing by an accelerated K-A star search;

DETAILED DESCRIPTION

Figure 1:
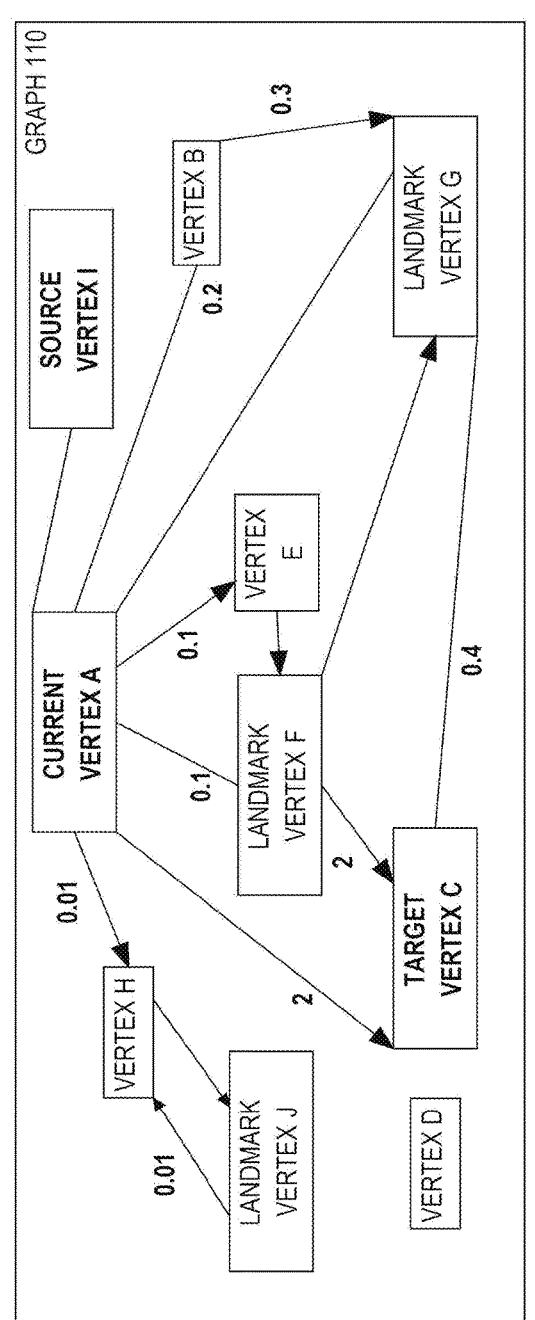
FIG. 1 is a block diagram that depicts an example computer that triangulates based on landmark vertices of a graph to accelerate searching for a few shortest paths between a source vertex and target vertex.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques herein select a small subset of vertices of a graph to be landmark vertices. For every vertex in the graph, the length of a shortest path to (and from, if the graph is directed) every landmark vertex is discovered and recorded. Distances to and from landmarks can then be shared across multiple concurrent queries. At runtime, when generating top k-cheapest paths for a given source/destination pair of vertices, some precomputed distances are used to estimate a distance of a given vertex to a target vertex of a query. Based on the estimated distances, exploration of intermediate paths is prioritized to reduce an exploration search space, thereby accelerating a top k path finding query. There is no top k-cheapest path algorithm that is already known to use landmarking for acceleration.

Compared to other existing solutions for answering top-k cheapest path queries, which build a shortest path tree (SPT) for every source/destination pair of vertices, techniques herein build landmarks and calculate landmark distances once at graph loading time and then share the landmark distances across different queries of the same graph. Landmark distances are used to estimate distances between other vertices, which may drive graph exploration and prune useless paths.

Advantages of techniques herein include:

faster: at runtime, SPTs are more expensive to compute than distance estimates herein;

smaller: the memory footprint does not grow with the amount of queries run. If there are only ten landmark vertices, then only ten properties are stored for every vertex, regardless how many queries run. SPT based solutions have to store an SPT per query; and controllable memory footprint: if queries explore only a region of the graph, techniques herein may limit landmarking to that region. SPT based solutions necessarily process a whole graph.

The above advantages are important for a multi-user graph processing system because small and controllable memory footprint, as well as speed, are crucial to sustain a high system throughput.

In an embodiment, a computer calculates, for a graph that contains vertices that include landmark vertices, distances between each vertex and each landmark vertex. Based on the distances from each vertex to each landmark vertex, a top few shortest paths from a source vertex to a target vertex are calculated.

In an embodiment, triangulation establishes a lower bound on a distance from a neighbor vertex of a current vertex to a target vertex of a query. In an embodiment, distance predictions based on the distance lower bounds are used to accelerate a K-A star search for the top few shortest paths.

1.0 Example Computer

FIG. 1 is a block diagram that depicts an example computer 100, in an embodiment. Computer 100 triangulates based on landmark vertices of a graph to accelerate searching for a few shortest paths between a source vertex and target vertex. Computer 100 may be a rack server such as a blade, a personal computer, a mainframe, a virtual computer, or other computing device.

In volatile memory and/or durable storage, computer 100 may store and/or load logical graph 110 that may contain many vertices such as A-J. FIGS. 1-5 regard same computer 100 and same graph 110. Contents of graph 110 are as follows.

Vertices A-J may be interconnected by edges. An edge may be directed. For example, a directed edge originates at vertex A and, as shown with an arrowhead, terminates at vertex H. A directed edge should only be traversed in a direction indicated by the edge. For example, vertex H is reachable from vertex A, but vertex A is not reachable from vertex H.

In an embodiment, a same two vertices may be connected by multiple redundant edges having a same direction and same or different lengths as explained below. In an embodiment, redundant edges are considered and may contribute separate solution paths as explained below. In an embodiment not shown and because computer 100 seeks optimal (i.e. shortest) graph traversal paths, redundant edges between a same two vertices in a same direction are ignored. With such redundant edges, only a shortest edge is considered.

An edge may be undirected, such as the edge that connects vertices A and I, as shown without an arrowhead. In an embodiment, an undirected edge may be implemented as two directed edges in opposite directions between a same two vertices.

A vertex, such as A, may have multiple originating, terminating, and/or undirected edges. Thus, a vertex may be directly connected to none, one, or many immediate neighbor vertices although, depending on edge direction, some neighbors might be unreachable or only indirectly reachable (i.e. by traversing through additional vertices and edges). For example due to edge direction, vertex A is connected to vertex H, but vertex A is unreachable from vertex H. Likewise, vertex G is connected to vertex B but, due to edge direction, vertex B is reachable from vertex G only through intermediate vertex A.

Graph 110 need not be connected. For example, vertex D is disconnected. Directly or indirectly connected vertices may be connected by multiple traversal paths. For example, vertex C is reachable from vertex F by path F→C and by path F→G→C.

Herein, distance and length are synonymous, and each edge has a length. Each traversal path containing multiple edges has a length that is a sum of lengths of those edges. Techniques herein are directly applicable when an edge metric is not a length. For example, edges may instead have:

a weight, a duration; for example, inversion due to traffic congestion or traffic lights may cause a longer distance route to be faster than a direct route, a financial cost; for example, inversion due to road tolls may cause a longer distance route to be cheaper than a direct route, or a logistic cost; for example, inversion due to fuel consumption may cause a longer distance flat route to be cheaper than a hilly direct route.

Edges may have different lengths (i.e. distances) as shown. For example, edge C-G has length 0.4 in both directions as shown. An edge may have a default length such as zero or one. In this example, the default edge length is one. Thus, edge F→G has a length of one.

Because edges may be directed, a same two vertices may be connected by two edges (i.e. an edge in each direction), and those two edges may have different lengths. For example, edge H→J is longer than edge J→H.

In an embodiment not shown, all edges have a same length of one. In that case, path F→C would be shorter (i.e. fewer edges) than path F→G→C, even though both paths originate at vertex F and terminate at vertex C.

In the shown embodiment, the length of a path is the sum of the lengths of the edges in the path. As shown and despite having more edges, the length of path F→G→C is 1+0.4=1.4, which is less than the length of path F→C that has a length of 2 as shown. Thus counter-intuitively, a path with more edges may or may not be shorter than a path with fewer edges.

In operation, computer 100 explores graph 110 to find a few shortest paths from a source vertex, such as I as shown, to a target vertex such as C as shown. In an embodiment, only paths without cycles are considered, which has two consequences: a) self-directed (not shown) edges are excluded, which is an edge that originates and terminates at a same vertex, and b) a traversal path cannot include a same vertex more than once. For example, path F→A→B→G→A→H is excluded because it visits vertex A twice. In an embodiment: cycles are included, a vertex may be revisited in a same traversal path, and a solution path may contain a cycle.

Computer 100 finds shortest paths in two phases. In a first phase, a subset of vertices are selected as landmarks, such as F-G and J. Landmark distances 120 are derived by discovering a shortest path between each vertex A-J to and from each landmark F-G and J. In this example, landmark distances 120 has at most: 10 vertices×3 landmarks×2 directions=sixty distances. In this example, landmark distances 120 has fewer than sixty distances because, between particular vertices and particular landmarks, there are no paths. For example, vertex A is unreachable from landmark J, which is shown in landmark distances 120 as a blank (i.e. no value). Depending on the embodiment, unreachability may be represented as a distance with an invalid value such as a negative number.

If a row in landmark distances 120 contains only blanks, then the vertex of that row is disconnected from all landmarks, such as vertex D. In landmark distances 120, the rows for vertices F-G and J that, as landmarks, contain some zeros because the distance between a landmark and itself is always zero.

During the first phase, computer 100 populates landmark distances 120 with shortest distances. Various shortest path algorithms may be used to populate landmark distances 120. In an embodiment, a shortest path algorithm accepts a single source vertex and a single target vertex. As explained above, landmark distances 120 records as many as sixty distances, in which case the shortest path algorithm may be invoked as many as sixty times. For example, the shortest path algorithm may be Bellman-Ford, Dijkstra, Gabow, or Thorup.

In an embodiment, the shortest path algorithm for landmark distance finding accepts multiple source vertices and/or multiple target vertices. Whether accepting multiple sources or only one source, shortest path algorithms may leverage common (i.e. shared) subpaths that are reachable from different source vertices and/or different intermediate vertices and/or that can reach different target vertices and/or different intermediate vertices. In an embodiment, a shortest path algorithm maintains one or many shortest path tree(s) (SPT). In an embodiment, a shortest path algorithm is based on multisource breadth first search (MS-BFS).

All pairs shortest path algorithms are excluded because they need too much time and/or space. All pairs shortest path needs quartic time based on how many vertices does graph 110 have. Techniques herein are faster than quartic By the end of the first phase, landmark distances 120 is ready to use. The first phase requires only graph 110. Whereas, the second phase also needs source vertex(s) and target vertex(s) that may be identified or otherwise selected by a query. In the second phase, computer 100 may receive a query (not shown) to find a few shortest paths from a particular source vertex to a particular target vertex. For example, the query may request the top two shortest paths from source vertex I to target vertex C as shown.

In this example, there are seven solution paths from source vertex I to target vertex C, shown as solution distances 130. Although solution path I→A→C contains the fewest edges, that is not one of the top two shortest paths from source vertex I to target vertex C. Instead, solution distances 130 shows that solution path I→A→B→G→C and solution path I→A→G→C are the two shortest paths. Thus, the query should return only those two paths.

In other examples, the query may request a top seven shortest paths or a top eight shortest paths from source vertex I to target vertex C. In both of those cases, the query should return exactly all seven of the solution paths in solution distances 130.

Most graph path search algorithms, such as breadth first search (BFS) or depth first search (DFS), are based on iterative exploration. Each iteration has a current vertex, such as with DFS, or a current subset of vertices such as a horizon or frontier with BFS. Edges fanning out from the current vertex(s) are traversed in that iteration.

New path(s) that are based on current path(s) are extended further by traversing current edge(s) to neighboring vertices. Thus, a path search incrementally (i.e. iteratively) grows paths longer and, due to fan out of edges, multiplies paths in quantity. Convergence by path finding techniques herein is guaranteed, as explained later herein, such that for any graph, only a finite set of intermediate paths and solution paths need processing.

For demonstration, solution distances 130 is sorted to show in which ordering would solution paths be discovered by a conventional greedy depth first search (DFS) that always traverses a shortest available edge. For example when the current vertex of the DFS is vertex A as shown, edge A→H would be the first of vertex A's edges to be traversed because edge A→H is vertex A's shortest originating edge, which is a bad choice because that is a dead end (i.e. target vertex C is not reachable from vertex H). Likewise, edge A→B would be almost the last of vertex A's edges to be traversed based on edge length, which is unfortunate because edge A→B is part of the shortest solution path.

Indeed, solution distances 130 shows that the shortest two solution paths are the last two solution paths to be discovered by greedy DFS, which may be counter-intuitive because greediness is conventionally intended to accelerate discovery of optimality. For example, greedy DFS typically outperforms BFS. As explained below and especially with FIG. 5, techniques herein outperform greedy DFS for various reasons including: a) better prioritization of edges than greedy DFS so that shortest paths are discovered sooner, b) predictive pruning (i.e. avoidance) of dead ends (i.e. useless paths), and c) as explained later herein, better halting criteria that predict that unexplored solution paths cannot possibly be shorter than solution paths already found.

2.0 Example Pruning

FIG. 2 is a block diagram that depicts an example pruning 200, in an embodiment. Pruning 200 applies pruning rules 1-2 that use landmark distances 120 to prune dead end vertices.

As discussed above, some vertices may be unreachable from some other vertices. For example, some vertices may be unreachable from some landmark vertices, and some landmark vertices may be unreachable from some vertices, shown as blanks in landmark distances 120 of FIG. 1. Pruning rules 1-2 detect unreachability and may cause some vertices to be excluded.

When a neighbor vertex of a current vertex is reachable from a landmark vertex, and a target vertex is not reachable from the landmark vertex, then pruning rule 1 detects that there is no path between the neighbor vertex and the target vertex. Per pruning rule 1, the neighbor vertex may be pruned (i.e. excluded from all iterations and all solution paths).

When a landmark vertex is reachable from the target vertex but not reachable from the neighbor vertex, then pruning rule 2 detects that there is no path between the neighbor vertex and the target vertex. Per pruning rule 2, the neighbor vertex may be pruned.

At the beginning of each iteration, pruning rules 1-2 may be applied to detect which neighbor vertices of the current vertex should be pruned. A pruned vertex is excluded, even when reachable from another vertex that is not yet the current vertex. Thus, one pruning may have a repeated performance benefit. Likewise, the benefit of pruning is further proportional to a size of a pruned subgraph that is reachable only through the pruned vertex. For example, the pruned subgraph may contain thousands of vertices and millions of edges that pruning techniques herein avoid, but greedy DFS cannot avoid.

Pruning occurs as follows based on current vertex A of a current iteration. Pruning 200 is a demonstrative table, which is not actually stored, that has a neighbor column that identifies each of neighbor vertices B-C, E, and G-H of current vertex A. Neighbor vertex I is excluded (i.e. not shown) because it was visited in a previous iteration (and should not be revisited).

Each neighbor vertex is repeated in the neighbor column for each of the three landmark vertices F-G and J shown in the landmark column. Each of pruning rules 1-2 has two respective conditions to satisfy or not by each pair of neighbor vertex and landmark vertex. Only if the first condition succeeds and the second condition fails for a given vertex pair, then that neighbor vertex is pruned.

Each of pruning rules 1-2 has two respective columns for the two conditions, which contain Booleans that indicate yes (i.e. condition succeeds) or no (i.e. condition fails). For a row in pruning 200 for either pruning rule 1 or 2, if the rule's first column indicates yes and the rule's second column indicates no, then that neighbor vertex is pruned.

The first column of pruning rule 1 has a condition that the neighbor vertex is reachable from the landmark vertex. That column shows no for some vertices, such that pruning rule 1 does not prune those neighbor vertices based on those vertex pairs.

The second column of pruning rule 1 has a condition that target vertex C is reachable from the landmark vertex. That column shows yes for many vertices, such that pruning rule 1 does not prune those neighbor vertices based on those vertex pairs.

If a blank is shown in one column of a pruning rule, then the other column of the pruning rule already indicates to not prune by that pruning rule.

Only the bottom row of pruning 200, which represents a pair having neighbor vertex H and landmark vertex J, has yes in pruning rule 1's first column and a no in pruning rule 1's second column. Thus, only neighbor vertex H is pruned by pruning rule 1 when the current vertex is A. As shown, neighbor vertex H is also the only neighbor vertex pruned by pruning rule 2 (i.e. when the landmark vertex is F and the current vertex is A). Thus, either of pruning rules 1-2 is sufficient to prune neighbor vertex H.

3.0 Example Triangulation

Figure 3:
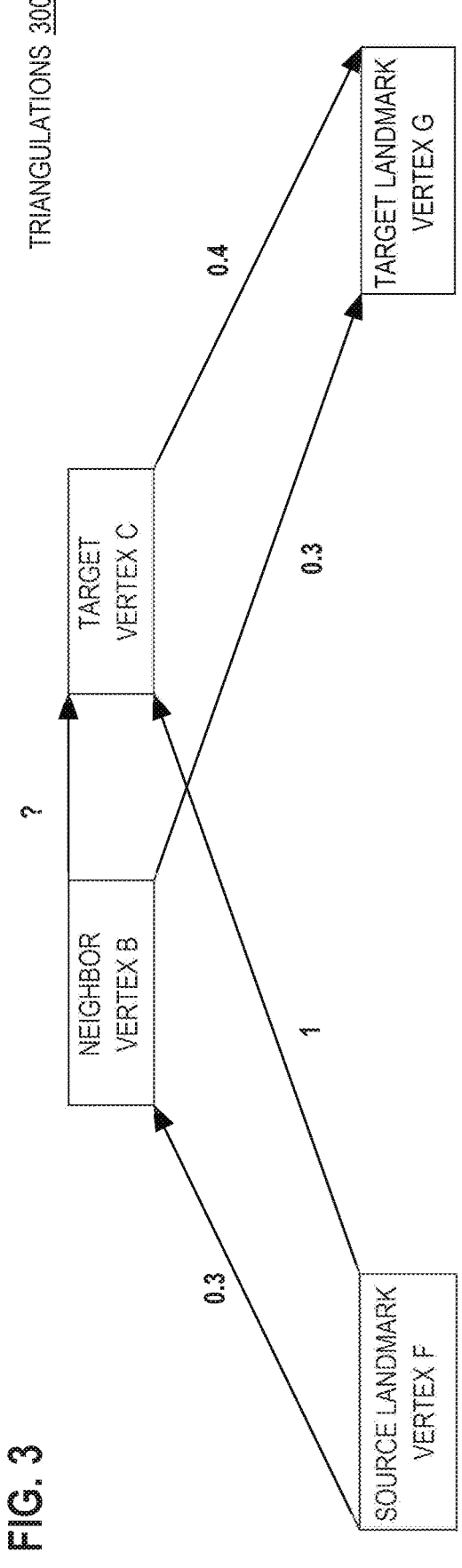
FIG. 3 is a block diagram that depicts example triangulations that calculate respective values that might be a best lower bound of a length of a shortest intermediate path from a neighbor vertex of a current to a target vertex.

FIG. 3 is a block diagram that depicts example triangulations 300, in an embodiment. Either or none of triangulations 300 may calculate a best lower bound of a length (shown as question mark ?) of a shortest partial path from neighbor vertex B of current vertex A (not shown) to target vertex C.

A triangulation contains three vertices which always are a neighbor vertex of the current vertex of the current iteration, a landmark vertex, and target vertex C of the current query. A triangulation calculates a possible, although not necessarily a most accurate, lower bound for a shortest path from the neighbor vertex to the target vertex. Most triangulations calculate a possible lower bound that is not the best.

One, a few, or none of the triangulations calculate the best lower bound. The best lower bound is the highest. Thus, multiple triangulations should be calculated before selecting the best lower bound. Although only two triangulations (F,B,C and B,C,G) are shown in FIG. 3, a more exhaustive set of triangulations should be calculated as shown later in FIG. 4.

A lower bound is an estimate that is guaranteed to be less than or equal to an actual length of a shortest path from the neighbor vertex to the target vertex. As explained later herein, a lower bound can be used to estimate how near or far is the target vertex from the neighbor vertex. Greedy DFS may waste time traversing a short edge that is part of a long solution path, which techniques herein avoid because a lower bound facilitates estimating how long is the solution path that contains the short edge. For example instead, a longer edge may be part of a solution path that is estimated to be shorter based on the longer edge having a smaller lower bound, as demonstrated later herein. A lower bound that is negative may be replaced with zero as a lower bound.

Landmark distances 120*i-ii* contain small portions of landmark distances 120 of FIG. 1. Each of landmark distances 120*i-ii* demonstrates one of the two shown triangulations, which differ based on whether the landmark vertex is a source or a target of the triangulation, although not necessarily a source or target of a path query.

When a landmark vertex such as F is a source vertex of a triangulation, then the lower bound of the triangulation is distance(L,T)−distance(L,V), shown as a formula in the lower left of landmark distances 120*i*, where: L is the landmark vertex; T is the target vertex of the query; and V is a neighbor vertex. The triangulated lower bound that is calculated by the formula is shown in the lower right of landmark distances 120*i*.

V may be a same neighbor vertex of a different current vertex of various iteration(s). Because triangulation does not require a current vertex, triangulation of some or all vertices with some or all landmark vertices may optionally be eagerly calculated before iterating or before vertex V is used as a neighbor vertex. Likewise, triangulation with neighbor vertex V may be lazily calculated on demand.

Triangulations usually would not be calculated before receiving a query because a target vertex of a query is needed for triangulation. In any case, lower bounds calculated by triangulations may be cached for reuse. In an embodiment, multiple queries, in parallel and/or in serial, may share a cache of triangulated lower bounds.

Each triangulation has an intermediate vertex between a source vertex and a target vertex, which is not a target vertex of the query. In some cases, the intermediate vertex is a landmark vertex. Either the source vertex or the target vertex of the triangulation, but not both, is a landmark vertex. When a landmark vertex such as G is a target vertex of a triangulation, then the lower bound of the triangulation is distance (V,L)−distance(T,L), shown as a formula in the lower left of landmark distances 120*ii*.

4.0 Distance Prediction

FIG. 4 is a block diagram that depicts example triangulations 400, in an embodiment. As explained above, accurate lower bounds may need triangulating with all landmark vertices for a given neighbor vertex. Each row of triangulations 400 shows a pair of triangulations based on a given neighbor vertex and a given landmark vertex. Each row has two triangulations because one triangulation may use the landmark vertex as a source vertex, and the other triangulation may use the same landmark vertex as a target vertex.

Each row having two triangulations also means two lower bounds, shown as columns X and Y. The higher of those two lower bounds is a more accurate estimate, shown as a maximum lower bound column. Each neighbor vertex has a separate row of triangulations for each landmark vertex.

For example, the top three rows of triangulations 400 contain triangulations for all three landmark vertices F-G and J. Although a given neighbor vertex has many rows, only one row has a best estimated lower bound, which is whichever of those rows has the highest value in the maximum lower bound column. For example, the maximum lower bound column shows 0.8 and 1.2 for neighbor vertex E, in which case the best lower bound estimate is 1.2.

The top row of triangulations 400 is as follows. Columns T-W have values from landmark distances 120*iii* that is a portion of landmark distances 120 of FIG. 1. Columns T and U have distances needed for one triangulation, and columns V and W have distances needed for the other triangulation. Both triangulations calculate a lower bound shown in respective columns X and Y, which are based on arithmetic subtraction such that X=T−U, and Y=V−W.

Triangulations 400 does not show all rows and all values. Blank values indicate irrelevant or uninteresting values, which does not imply that those values are not calculated. Some rows are not shown that are irrelevant or uninteresting. For example, landmark vertex J lacks interesting rows because landmark vertex J has very limited bi-directional reachability, such that landmark vertex J does not contribute interesting values to the maximum lower bound column. Rows for neighbor vertex H are not shown because vertex H was pruned as explained earlier herein.

Triangulations 400 is demonstrative instead of stored. Caching of lower bounds entails caching of best values from the maximum lower bound column, which may be cached as properties of the neighbor vertex or in a cache that is keyed by neighbor vertex.

5.0 Accelerated K-A Star Search

Various graph search algorithms have various aspects, such as radius, backtracking, recursion, concurrency, and/or bias, that may have a substantial impact on performance when a graph is huge. For example, a car that traverses its way thru a Manhattan-style city grid of streets must make a choice between three departing edges at each traffic light intersection. A seemingly moderate route of only twenty intersections would involve an aggregate choice between $3^20 \approx 3.5$ billion distinct routes. As such, acceleration of graph search by intelligent heuristics may be important for non-trivial graphs.

Figure 5:
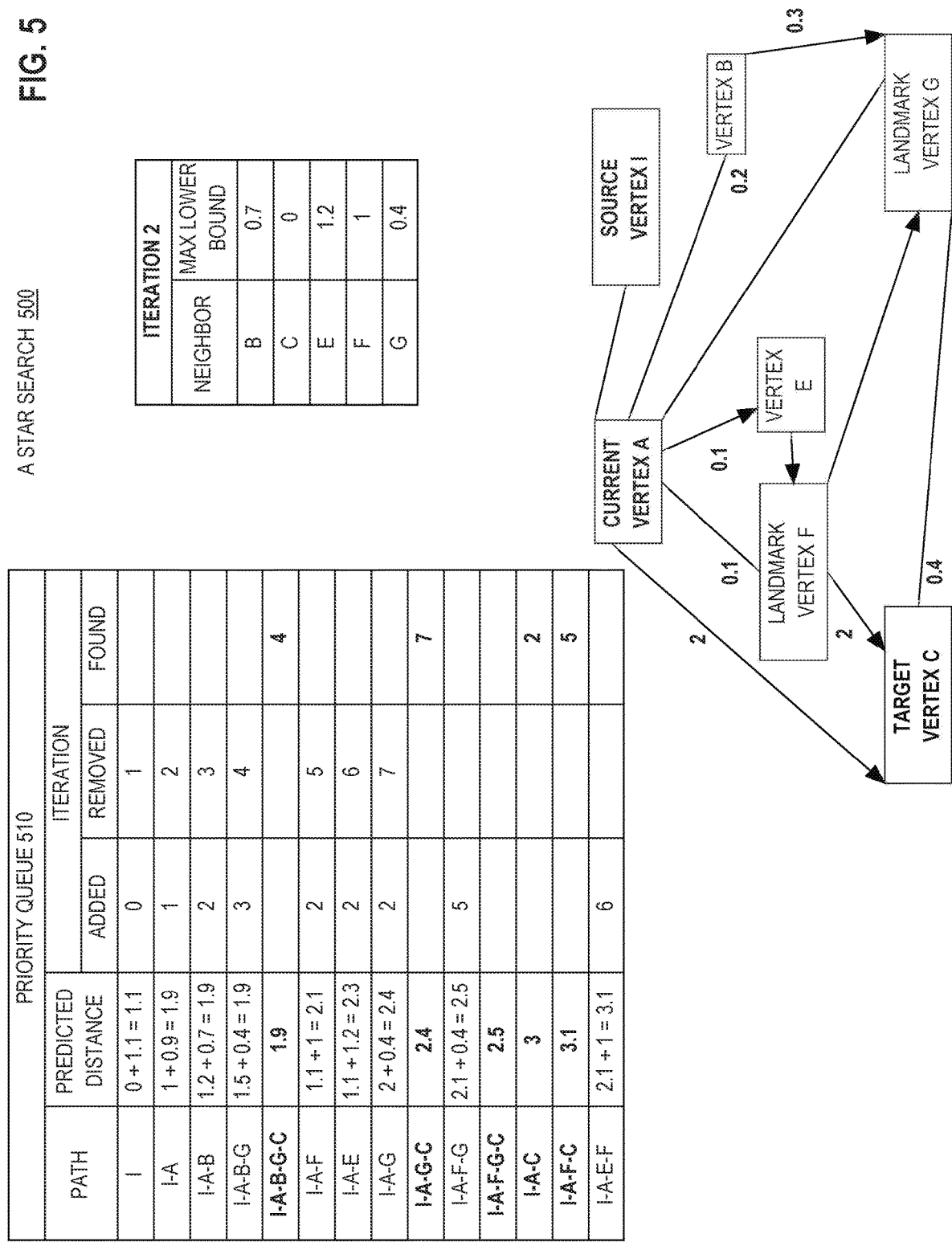
FIG. 5 is a block diagram that depicts an example accelerated K-A star search, which is a graph search algorithm that uses a priority queue to discover a top few shortest paths.

FIG. 5 is a block diagram that depicts an example accelerated K-A star search 500, in an embodiment. K-A star search (a.k.a. K-A*search) 500 is a graph search algorithm that uses priority queue 510 to discover a top few (i.e. K) shortest paths of FIG. 1. A portion of graph 110 of FIG. 1 is shown in FIG. 5 for demonstrative reference.

K-A star search 500 iteratively generates intermediate paths by incrementally growing previous intermediate paths slightly longer. Each intermediate path has a length and an estimated lower bound of a remaining distance between the last vertex of the path and the target vertex of the query. For example, the path column of priority queue 510 has path I→A for which the predicted distance column shows an intermediate path length of 1 and an estimated lower bound of remaining distance of 0.9.

Thus, iterative growth of path I→A to include additional vertices is predicted to reach target vertex C by growing to a length of at least 1+0.9=1.9, as shown in the predicted distance column. That estimated lower bound of 0.9 is taken from the lower right of triangulations 400 of FIG. 4 with current vertex I, neighbor vertex A, and landmark vertex F.

K-A star search 500 favors intermediate paths that are predicted to reach target vertex C with a shorter total length that sums current length plus estimated lower bound of remaining distance as explained above. That bias against predicted distance is why K-A star search 500 has priority queue 510 that sorts ascending on the predicted distance column.

Priority queue 510 is empty when created. Source vertex I is then initially stored in priority queue 510, which is shown as a top row in priority queue 510.

K-A star search 500 is iterative. Because path I is added to priority queue 510 before iteration begins, path I is shown in priority queue 510 as added in iteration zero, as shown in the added column, that is before iterating begins. The first iteration is iteration one.

Only the path and predicted distance columns of priority queue 510 are actually stored. The three iteration columns are demonstrative and not stored. The iteration columns show changes as to which paths does priority queue 510 contain in each iteration as explained below.

In each iteration, the path in the current top row is expanded after being removed from priority queue 510. For example, path I is removed for expansion in iteration one as shown in the removed column.

Priority queue 510 shows the evolution of queue contents over time for all iterations 1-7, which is not a snapshot of queue contents for an individual iteration. For example based on the added and removed columns, priority queue 510 contains only path I→A in iteration one because paths I and I→A were added during or before iteration one, but path I was removed during iteration one for expansion. Thus although not shown as such, path I→A is at the top of priority queue 510 between iterations 1-2 and is removed for expansion in iteration 2.

Expansion entails: a) removal of the path of the top row of priority queue 510, and that path ends with the current vertex, b) for each of available edge of the current vertex, creating and inserting, into priority queue 510, a new path that is based on the removed path as extended further by the current edge to a neighbor vertex. Thus, K-A star search 500 incrementally/iteratively grows paths longer and, due to fan out of edges, multiplies paths in quantity.

Inserting a new intermediate path into priority queue 510 entails: calculating the length of the new path, recalling the lower bound estimate of the remaining distance from the last vertex in the new path to target vertex C, and summing those two quantities to calculate a predicted distance as a sorting key for priority queue 510. For example in iteration 2, path I→A is dequeued and expanded to reach from current vertex A to neighbor vertices B-C and E-G whose estimated lower bounds are shown in an iteration 2 table on the right that has a portion of the max lower bound column of triangulations 400 of FIG. 4. Thus, triangulations affect the sorting of priority queue 510, which is a novel aspect of K-A star search 500. Thus, the bias of K-A star search 500 is not greedy, but instead is predictive, which also is novel.

Convergence (i.e. eventually exhausting priority queue 510) is guaranteed because K-A star search 500 always either: detects that K top solution paths are already discovered, or priority queue becomes exhausted (i.e. becomes empty), as explained later herein. Such guaranteed convergence occurs even if cycles are included.

Values in the predicted distance column of priority queue 510 are monotonically increasing because K-A star search 500 is biased. A count of edges in queued paths is not monotonic because fewer edges does not mean shorter length so far, nor shorter length remaining, nor shorter combined length, as explained earlier herein. For example, path I→A→B→G occurs in priority queue 510 above path I→A→F even though path I→A→F has fewer edges and was enqueued earlier.

Paths such as I→A→B→G→C and I→A→C are shown as bold because they are solution paths that reach target vertex C. The added column is blank for solution paths because solution paths should not be added to priority queue 510. Showing solution paths in priority queue 510 is demonstrative. Some queries for some graphs will not return all solution paths, such as a query for a top few shortest paths, such as top/best k paths when there are more than k solution paths.

Because every solution path for the current query ends with target vertex C, a path is recognized as a solution path as soon as the path is generated. The found column of priority queue 510 shows in which iteration is each solution path generated.

In this example, the query seeks the top two paths from source vertex I to target vertex C. The found column indicates that the first two solution paths to be reached are found during respective iterations 2 and 4. That includes solution path I→A→B→G→C, which is guaranteed to be one of the top two solution paths because at the end of iteration 4, priority queue 510 contains only three intermediate paths, whose predicted distances are 2.1, 2.3, and 2.4 that are longer than 1.9, which is the length of solution path I→A→B→G→C.

In other words, K-A star search 500 knows as soon as solution path I→A→B→G→C is generated that it will always be the shortest solution path even though priority queue 510 is not yet empty. Also at iteration 4, it is still unknown whether previously found solution path I→A→C is or is not a top two solution path because priority queue 510 contain intermediate paths whose predicted distance is less than the length of solution path I→A→C. Thus, priority queue 510 should continue iterating beyond iteration 4 to establish which solution path, already discovered or not, will be the second shortest solution path.

Iteration 7 is the final iteration of K-A star search 500, even though priority queue 510 still contains two unexplored intermediate paths I→A→F→G and I→A→E→F, and solution path I→A→F→G→C was not found. In iteration 7, solution path I→A→G→C is generated and detected to be the second shortest solution path for a top two query, in which case searching/iterating stops. Both intermediate paths still enqueued have predicted distances that are longer than the length of solution path I→A→G→C.

Because a predicted distance is a lower bound, expansion of the remaining enqueued intermediate paths cannot reach a solution path that is shorter than either of the top two paths already found. Thus, K-A star search 500 is finished without priority queue 510 underflowing. Whereas a BFS or DFS, whether greedy or not, does not make predictions and would not stop until priority queue 510 is finally empty.

6.0 Example Path Finding Process

Figure 6:
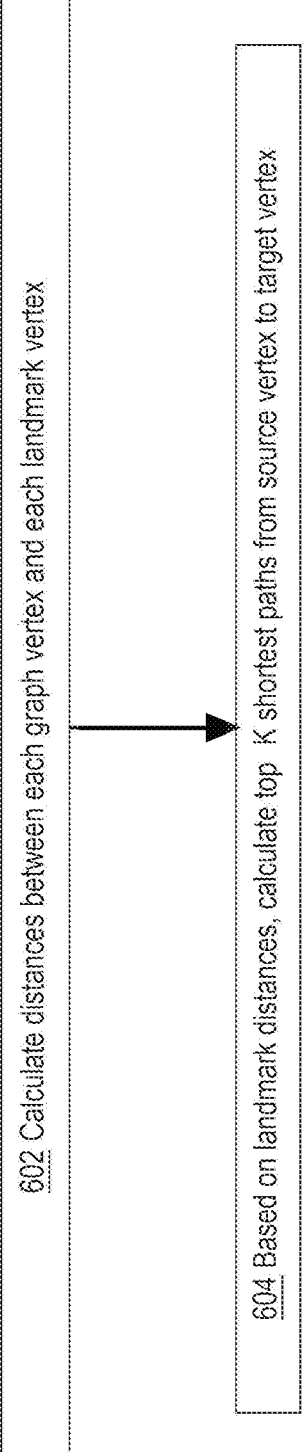
FIG. 6 is a flow diagram that depicts an example process to accelerate searching for a shortest few paths between a source vertex and target vertex by triangulating based on landmark vertices.

FIG. 6 is a flow diagram that depicts an example process to accelerate searching for a shortest few paths between a source vertex and a target vertex by triangulating based on landmark vertices, in an embodiment. FIG. 6 is discussed with reference to FIGS. 1 and 5.

Step 602 is preparatory, may occur before receiving path finding queries, and need occur only once per graph, such as 110. For example, step 602 may occur while eagerly or lazily loading graph 110. Step 602 calculates distances between each graph vertex and each landmark vertex.

In an embodiment, a count of landmark vertices is based on a count of vertices and/or edges of graph 110. In an embodiment, the count of landmark vertices is logarithmic to the count of vertices. For example, step 602 may select logN landmark vertices, where N counts all vertices in graph 110. In an embodiment, the count of landmark vertices is a small constant such as 10, 100, or 1000.

Step 602 calculates a separate distance in both directions, which are a distance to each landmark vertex and a distance from each landmark vertex. Step 602 may use matrix arithmetic, such as with a distance matrix, such as tropical matrix multiplication and/or min-plus matrix algebra. Step 602 may instead use brute force exploration, such as graph path finding search, to discover distances.

Step 602 need not identify or record actual shortest paths to and from landmark vertices, because recording shortest path lengths is sufficient. Step 602 calculates landmark distances 120 that may be stored as two columns associated with each landmark vertex, or stored as two rows associated with each vertex A-J. Landmark distances 120 may be cached in memory or on disk for subsequent queries of same graph 110.

Based on landmark distances 120, step 604 calculates a top K shortest paths from a source vertex to a target vertex. For example, computer 100 may receive a path finding query for graph 110 that specifies source vertex I and target vertex C and limits results to a top three solution paths, which may cause step 604. Step 604 may include some or all of the following activities.

In an eager embodiment, step 604 calculates, based on target vertex C, all triangulations and/or pruning upon receiving a query and before K-A star search 500 starts iterating. For example, step 604 may occur for each of multiple queries. Whereas, step 602 need occur only once if those queries share same graph 110. In a lazy embodiment, step 604 immediately starts K-A star search 500, and triangulation and pruning occur only for and when a particular vertex is the current vertex of an iteration of K-A star search 500. For example, when vertex A is a current vertex, then other vertices are neighbors of A, and those neighbors may be pruned or triangulated to estimate a lower bound on distance from neighbor vertices to target vertex C.

Once pruned, a vertex remains pruned for the remainder of K-A star search 500. In an embodiment, lazy triangulations are cached for reuse in later iterations and/or by concurrent or later queries that share same target vertex C. For example, triangulations may be evicted from a cache based on a least recently used (LRU) cache policy. For example, queries with different target vertices do not share triangulations and may compete for cache presence.

In an embodiment, landmark distances 120 are cached. For example, all queries of same graph 110, regardless of source vertex and target vertex, may share same landmark distances 120. In an embodiment, landmark distances 120 remain in memory so long as graph 110 remains loaded K-A star search 500 and step 604 finish when the top K shortest paths are found, even if priority queue 510 still contains unexplored intermediate paths and/or some solution paths are undiscovered. If priority queue 510 is exhausted/empty, then K-A star search 500 and step 604 finish. The top K shortest paths (or fewer if priority queue 510 underflows) may be returned to a client as an answer to the client's query.

7.0 Example Landmarking Process

FIGS. 7-8 show computer 100 in operation, in an embodiment. The process of FIG. 7 is preparatory and may eagerly operate immediately after loading graph 110, without waiting for a query. The process of FIG. 8 is fully operational and may occur during query execution.

FIG. 7 is a flow diagram that depicts an example process for designating landmark vertices from which all distances needed for triangulation may be calculated, in an embodiment. FIG. 7 is discussed with reference to FIGS. 1 and 5.

The process of FIG. 7 has four phases that are in the following sequence: 1) limiting how many landmark vertices, 2) identifying landmark vertices, 3) calculating landmark distances needed for triangulation, and 4) storing landmark distances in memory and/or on disk.

Although not shown, the first phase calculates how many landmark vertices are needed. For example, a count of landmark vertices may be based on a fixed amount and/or fraction(s) of vertices of graph 110 such as: a percentage, a logarithm, a ratio of vertices to edges, and/or, with a diameter of graph 110 measured in edge count, a ratio of diameter to vertices. No matter what formula for limiting landmark vertices, landmark vertices should be a minority of vertices in graph 110.

More landmark vertices may produce more accurate and higher estimated lower bounds for triangulation. However, better triangulation does not mean better solution paths. Too few landmark vertices may cause inaccurate triangulation that yields identical query results, but needs more time and space because priority queue 510 would contain less accurate and underestimated predicted distances 510 that cause K-A star search 500 to degrade toward being a greedy DFS, although still having possibly better than quartic complexity. Whereas, too many landmark vertices may increase triangulation latency with little or no increase in accuracy.

As discussed later herein and because an optimal amount of landmarks may be hard to calculate, K-A star search 500 may start with too few landmark vertices and, when average query latency exceeds a threshold, additional landmark vertices may be designated, which may happen repeatedly until latency is acceptable or stops improving. Numeric processing that prepares for or performs triangulation can readily be incrementally performed whenever a landmark vertex is added. Monotonic growth of landmark vertices is readily accommodated. Addition of a landmark vertex either raises the value and accuracy of estimated upper bound(s), or those estimates remain unchanged.

The second phase entails identifying landmark vertices. Shown embodiments have different ways of vertex selection. As shown, arrows connect a multi-step way of choosing vertices. Absence of arrows shows separate ways of choosing, which may or may not be combined in some embodiments.

Step 701 randomly selects landmark vertices. For example, every tenth, hundredth, or thousandth vertex may be a landmark vertex.

Step 702 limits selection of landmark vertices to topographic or topologic region(s) of graph 110, such as when graph 110 is hierarchically arranged such as planar or radial. For example, landmark selection may be somewhat or entirely biased toward the periphery/perimeter of graph 110. If target vertex(s) of queries are known, then step 702 may limit landmark selection to a region of graph 110 that contains most or all target vertices to increase triangulation accuracy so much that fewer landmark vertices may be needed to achieve a same accuracy.

General biases for selection may maximize distance between landmark vertices and/or evenly space landmark vertices, based on edge lengths. Steps 703A-B cooperate to maximize topographic distance between landmark vertices. Step 703A initializes a growing subset of vertices with a single seed vertex, such as a randomly selected vertex. The seed vertex will not become a landmark vertex. Step 703B iteratively selects a vertex that is farthest from all vertices in the growing subset, based on a sum of distances. The selected vertex becomes a landmark vertex and is added to the growing subset.

Steps 704A-B cooperate to maximize topologic distance between landmark vertices. Step 704A selects: a seed vertex that will not become a landmark vertex, a first landmark vertex that is furthest from the seed vertex, and a second landmark vertex that is furthest from the first landmark vertex and the seed vertex.

Step 704B does not use the seed vertex. Step 704B iteratively selects a vertex that maximizes an arithmetic difference between: a) a sum of distances between all pairs of landmark vertices along shortest paths that include the selected vertex, and b) a sum of distances between all pairs of landmark vertices selected so far, not including the selected vertex.

Although not shown, the third phase calculates landmark distances 120. The fourth phase entails step 705 that stores portions of landmark distances 120 as properties of vertices, such as in columnar vector(s) in memory and/or on disk. After step 705, computer 100 is ready to triangulate.

8.0 Example Query Processing

FIG. 8 is a flow diagram that depicts example query processing, in an embodiment. FIG. 8 is discussed with reference to FIGS. 1, 4-5, and 9.

Step 801 receives a query that specifies a source vertex, a target vertex, and a limit on how many shortest paths to find.

In an embodiment, optional step 802 eagerly triangulates for some or all vertices A-J based on landmark distances 120. For example, step 802 may calculate triangulations 400. Step 802 may be slow, and triangulations 400 may have a huge storage footprint, which may be reasons to perform step 802 only for some vertices or entirely skip step 802. Likewise, triangulations for some or all vertices may already be cached by previous queries with same target vertex C of same graph 110. As explained later herein, triangulations can be performed lazily and individually or in bulk. Triangulations are idempotent. For example, a triangulation evicted from cache can be regenerated on demand.

Step 803 performs an accelerated K-A-star search, such as 500 or 900. The K-A star search finds the top few shortest paths as an answer to the query of step 801. That answer may be sent back to a client.

In an embodiment, step 804 detects financial fraud based on the top few shortest paths that answer the query. Fraud detection is computationally expensive. For example, discovering illegal finance may be based on relationships and events between actors, such as transfers. Shortest paths may increase the relevance of graph analysis by achieving a search radius. Shortest paths may identify suspicious affinities of activities or actors. As an example, some financial compliance applications rely on a logical graph for investigating risks of wire transfers, which may reveal how a particular financial account is connected to other accounts that are known to be fraudulent.

Based on sharing/reusing/caching of landmark distances 120, step 805 sequentially and/or concurrently executes multiple queries of same graph 110.

Step 806 designates additional landmark vertices based on latency of query(s). As explained earlier herein: a) a K-A star search herein is accelerated by increased accuracy of distance lower bounds, b) more triangulations increases accuracy of distance lower bounds, c) more landmark distances 120 provides more triangulations, and d) more landmark vertices provides more landmark distances 120. Also as explained earlier herein, total latency to load graph 110 and execute a first query has a tension between: a) accelerating by increasing accuracy, and b) accelerating by avoiding preparatory calculations needed to increase accuracy.

As discussed earlier herein, overall efficiency may be increased by: a) optimistically starting with too few landmarks, b) detecting excessive latency of individual or multiple queries such as with a threshold, c) repeatedly designating one or some additional vertices to become landmark vertices until latency becomes acceptable or ceases to improve, and d) calculating additional triangulations and replacing upper bounds as more landmark vertices are added by step 806.

9.0 Early Termination of Search

FIG. 9 is a flow diagram that depicts example processing by accelerated K-A star search 900, in an embodiment. FIG. 9 is discussed with reference to FIGS. 1 and 5. K-A star search 900 may be an implementation of K-A star search 500.

Step 901 operates a priority queue that contains intermediate paths that are ordered/sorted by sum of intermediate path length and estimated distance remaining to target vertex C. For example, the priority queue may be implemented by a tree-like heap structure such as with heapsort of a binary heap. A binomial heap has faster insertions than a binary heap, and insertions are the predominate queue operation of accelerated K-A star searches herein, such as when the K-A star search ceases before the priority queue is empty.

Step 902 removes the head of the priority queue, which is an intermediate path that is predicted to be part of a shortest path. Step 902 identifies each neighbor vertex of the current vertex, which is the last vertex in the intermediate path. Step 902 detects that the neighbor vertex was already expanded K times during a top K shortest paths search. That is, for the current query, K intermediate paths that terminated at the neighbor vertex had during previous iterations already reached the head of the priority queue and been removed from the priority queue. Subsequent steps 903-906 occur only for neighbor vertices that were not already expanded K times.

The intermediate path is extended in step 903 to generate new path that contains the intermediate path and an edge that terminates at the neighbor vertex.

If the neighbor vertex is target vertex C, then the new path is a solution path, though not necessarily a top few solution paths. Step 904 calculates the length of the new path and detects whether or not the neighbor vertex is target vertex C. If the new path is a solution path, then step 904 also detects whether or not the top K shortest paths is guaranteed to include the new path, which is the case if the length of the new path is less than the cost of the new head of the priority queue, where cost means predicted length of a shortest solution path that contains the new head of the priority queue. That cost was previously calculated and stored when the new head of the priority queue was inserted somewhere into the priority queue in an earlier iteration of the K-A star search. Because the new head of the priority queue may affect step 904, step 904 may detect a top K shortest path even though the priority queue is not empty.

In an embodiment that excludes cycles, steps 905-906 occur only for new paths generated in step 903 that do not terminate at target vertex C. In other words, steps 905-906 occur for new paths that are intermediate paths, but not for new paths that are solution paths. An embodiment that includes a cycle that contains target vertex C may perform steps 905-906 with a recognized solution path further processed as an intermediate path.

Step 905 lazily triangulates based on landmark vertices, target vertex C, and the neighbor vertex of step 902. If triangulation for the neighbor vertex was eagerly calculated and/or cached, then step 905 is skipped for the neighbor vertex. However, the current vertex of step 902 may have other neighbor vertices that need triangulation.

Step 906 calculates a cost of the new path generated in step 902 based on estimated distance from intermediate vertex to target vertex. Cost is the predicted length of a shortest solution path that contains the new path, which entails adding the length of the new path to the distance lower bound from the neighbor vertex of step 902 to target vertex C.

Step 902 is performed once per iteration of K-A star search 900, which dequeues an intermediate path and, in that iteration, steps 903-906 are performed for each neighbor vertex of the last vertex of the dequeued intermediate path. In any case, K-A star search 900 iterates until K shortest paths are designated, shown as step 907, or until the priority queue underflows. For example, K-A star search 900 may identify at least K solution paths, without knowing whether or not that includes the top K shortest paths. For example, K-A star search 900 may: a) iterate even after generating the top K shortest paths, and b) definitively designate the already generated top K shortest paths only after additional iterating, such as before or upon the priority queue underflowing, which may happen when estimated upper bounds are significantly inaccurate.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 10:
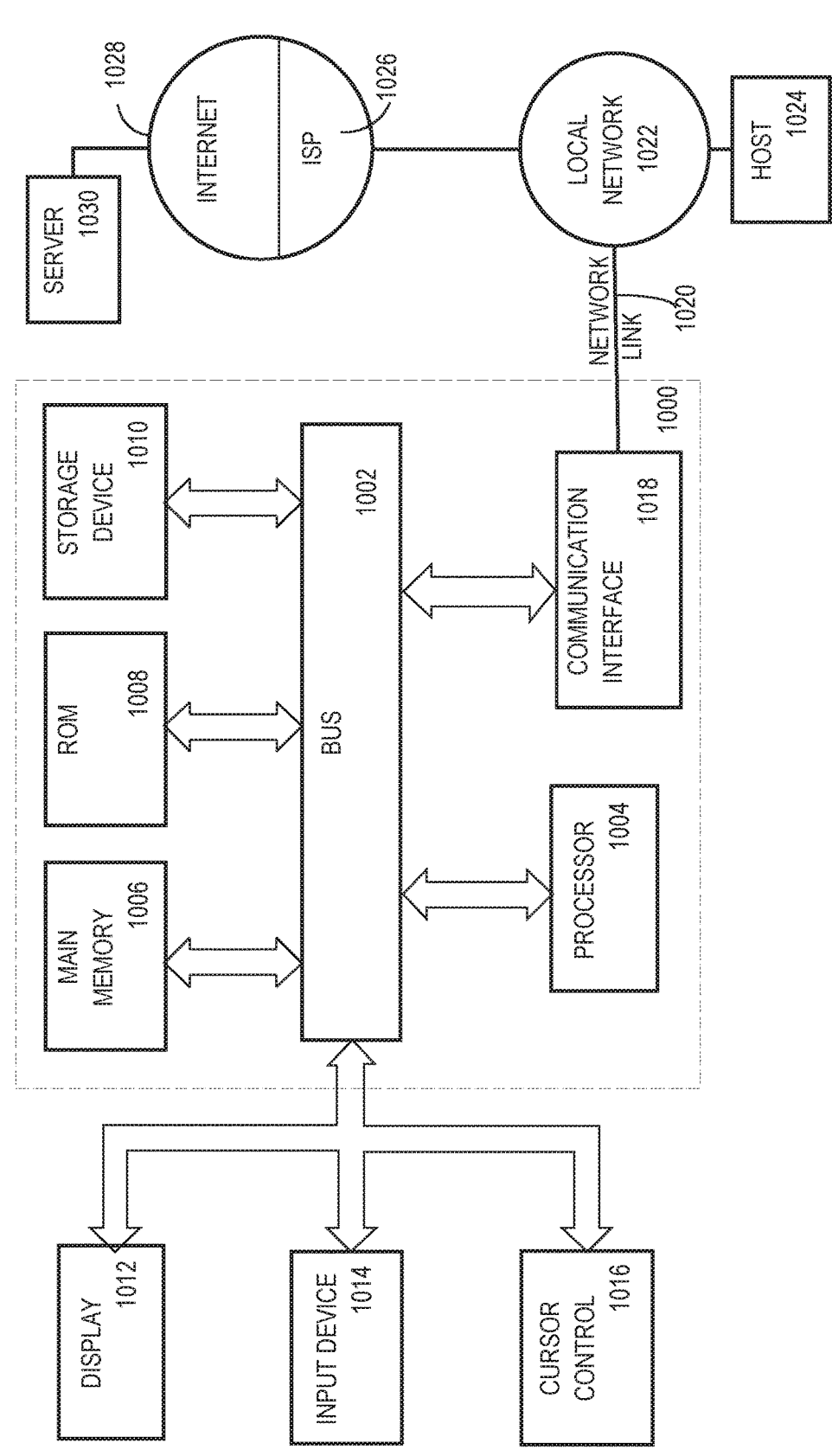
FIG. 10 is a block diagram that illustrates a computer system upon which an embodiment of the invention may be implemented.

For example, FIG. 10 is a block diagram that illustrates a computer system 1000 upon which an embodiment of the invention may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk, optical disk, or solid-state drive is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1010. Volatile media includes dynamic memory, such as main memory 1006. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid-state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

Software Overview

Figure 11:
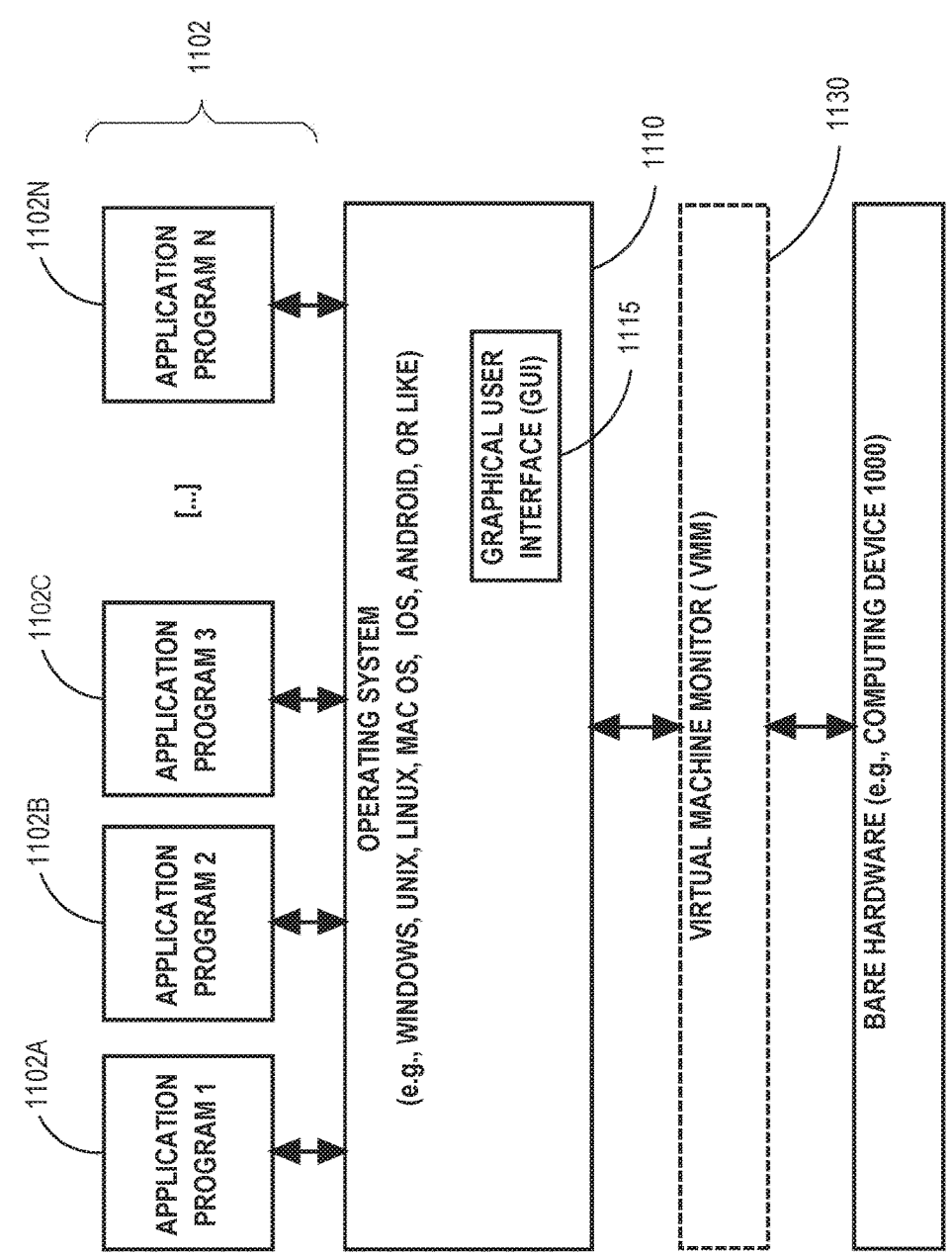
FIG. 11 is a block diagram that illustrates a basic software system that may be employed for controlling the operation of a computing system.

FIG. 11 is a block diagram of a basic software system 1100 that may be employed for controlling the operation of computing system 1000. Software system 1100 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1100 is provided for directing the operation of computing system 1000. Software system 1100, which may be stored in system memory (RAM) 1006 and on fixed storage (e.g., hard disk or flash memory) 1010, includes a kernel or operating system (OS) 1110.

The OS 1110 manages low-level aspects of computer operation, including managing execution of processes, memory allocation, file input and output (I/O), and device I/O. One or more application programs, represented as 1102A, 1102B, 1102C . . . 1102N, may be "loaded" (e.g., transferred from fixed storage 1010 into memory 1006) for execution by the system 1100. The applications or other software intended for use on computer system 1000 may also be stored as a set of downloadable computer-executable instructions, for example, for downloading and installation from an Internet location (e.g., a Web server, an app store, or other online service).

Software system 1100 includes a graphical user interface (GUI) 1115, for receiving user commands and data in a graphical (e.g., "point-and-click" or "touch gesture") fashion. These inputs, in turn, may be acted upon by the system 1100 in accordance with instructions from operating system 1110 and/or application(s) 1102. The GUI 1115 also serves to display the results of operation from the OS 1110 and application(s) 1102, whereupon the user may supply additional inputs or terminate the session (e.g., log off).

OS 1110 can execute directly on the bare hardware 1120 (e.g., processor(s) 1004) of computer system 1000. Alternatively, a hypervisor or virtual machine monitor (VMM) 1130 may be interposed between the bare hardware 1120 and the OS 1110. In this configuration, VMM 1130 acts as a software "cushion" or virtualization layer between the OS 1110 and the bare hardware 1120 of the computer system 1000.

VMM 1130 instantiates and runs one or more virtual machine instances ("guest machines"). Each guest machine comprises a "guest" operating system, such as OS 1110, and one or more applications, such as application(s) 1102, designed to execute on the guest operating system. The VMM 1130 presents the guest operating systems with a virtual operating platform and manages the execution of the guest operating systems.

In some instances, the VMM 1130 may allow a guest operating system to run as if it is running on the bare hardware 1120 of computer system 1100 directly. In these instances, the same version of the guest operating system configured to execute on the bare hardware 1120 directly may also execute on VMM 1130 without modification or reconfiguration. In other words, VMM 1130 may provide full hardware and CPU virtualization to a guest operating system in some instances.

In other instances, a guest operating system may be specially designed or configured to execute on VMM 1130 for efficiency. In these instances, the guest operating system is "aware" that it executes on a virtual machine monitor. In other words, VMM 1130 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:

storing, in a graph database, a graph that contains a plurality of graph vertices that include a plurality of landmark vertices;

calculating, for the graph, a plurality of distances between each vertex of the plurality of graph vertices and each vertex of the plurality of landmark vertices, including respective distances between a particular landmark vertex and each vertex of the plurality of graph vertices;

performing, after said calculating and storing, a first K-A star search that is based on the plurality of distances from each vertex of the plurality of graph vertices to each vertex of the plurality of landmark vertices, wherein the first K-A star search detects a first plurality of paths of shortest distance from a first source vertex of the plurality of graph vertices to a first target vertex of the plurality of graph vertices; and performing after said performing said first K-A star search:

including an additional vertex of the plurality of graph vertices into the plurality of landmark vertices, and executing, based on the plurality of distances from each vertex of the plurality of graph vertices to each vertex of the plurality of landmark vertices, including the additional vertex, a path query on the graph in the graph database to detect a second plurality of paths of shortest distance from a second source vertex of the plurality of graph vertices to a second target vertex of the plurality of graph vertices;

wherein:

a count of the first plurality of paths of shortest distance and a count of the second plurality of paths of shortest distance do not exceed a threshold;

the method is performed by one or more computers.

2. The method of claim 1 wherein said storing the plurality of distances from each vertex of the plurality of graph vertices to each vertex of the plurality of landmark vertices comprises storing distances of the plurality of distances that originate or terminate at the vertex of the plurality of graph vertices as property(s) of the vertex.

3. The method of claim 1 further comprising executing, based on said plurality of distances between each vertex of the plurality of graph vertices and each vertex of the plurality of landmark vertices, a plurality of queries of same said graph.

4. The method of claim 3 wherein:

the plurality of queries of same said graph include a first query and a second query;

at least one selected from the group consisting of:

the first query has a different source vertex than the second query, and

the first query has a different target vertex than the second query.

5. The method of claim 1 further comprising at least one of:

selecting the plurality of landmark vertices from a particular region of the graph, and increasing the plurality of landmark vertices based on latency of query(s) of the graph.

6. The method of claim 1 further comprising:

adding, to a subset of said plurality of graph vertices that is initially empty, a vertex from said plurality of graph vertices;

iteratively selecting said plurality of landmark vertices from said plurality of graph vertices by adding, to said subset of said plurality of graph vertices and to said plurality of landmark vertices, a vertex of said plurality of graph vertices that is furthest from said subset of said plurality of graph vertices.

7. The method of claim 1 wherein:

the plurality of landmark vertices consists of: a) a first landmark vertex that is furthest from a seed vertex of said plurality of graph vertices, b) a second landmark vertex that is furthest from the first landmark vertex and the seed vertex, and c) a subset of said plurality of landmark vertices without the first landmark vertex and the second landmark vertex;

the method further comprises iteratively selecting said subset of the plurality of landmark vertices from said plurality of graph vertices by adding, to said subset of the plurality of landmark vertices, a vertex of said plurality of graph vertices that maximizes an arithmetic difference between: a) a sum of distances between all pairs of landmark vertices of the plurality of landmark vertices along paths that include said vertex, and b) a sum of distances between all pairs of landmark vertices of the plurality of landmark vertices.

8. The method of claim 1 wherein a size of the plurality of landmark vertices is based on a logarithm of a size of the plurality of graph vertices.

9. The method of claim 1 wherein said first K-A star search comprises triangulation based on said plurality of landmark vertices.

10. The method of claim 9 wherein:

the method further comprises receiving a query that specifies said first source vertex and said first target vertex;

said triangulation based on said plurality of landmark vertices occurs either:

before said first K-A star search, or after receiving said query that specifies said first source vertex and said first target vertex.

11. The method of claim 9 wherein the first K-A star search comprises costing a partial path from said first source vertex to an intermediate vertex based on a distance from the intermediate vertex to said first target vertex through a landmark vertex of the plurality of landmark vertices.

12. The method of claim 1 further comprises:

operating a queue that contains a plurality of intermediate paths of the graph;

generating a new path that contains an intermediate path of the plurality of intermediate paths;

before the queue becomes empty, detecting that a last vertex of said intermediate path was expanded a threshold amount of times.

13. The method of claim 1 further comprising detecting financial fraud based on said first plurality of paths of shortest distance from the first source vertex of the plurality of graph vertices to the first target vertex of the plurality of graph vertices.

14. One or more non-transitory computer-readable media storing instructions that, when executed by one or more processors, cause:

storing, in a graph database, a graph that contains a plurality of graph vertices that include a plurality of landmark vertices;

calculating, for the graph, a plurality of distances between each vertex of the plurality of graph vertices and each vertex of the plurality of landmark vertices, including respective distances between a particular landmark vertex and each vertex of the plurality of graph vertices;

performing, after said calculating and storing, a first K-A star search that is based on the plurality of distances from each vertex of the plurality of graph vertices to each vertex of the plurality of landmark vertices, wherein the first K-A star search detects a first plurality of paths of shortest distance from a first source vertex of the plurality of graph vertices to a first target vertex of the plurality of graph vertices; and performing after said performing said first K-A star search:

including an additional vertex of the plurality of graph vertices into the plurality of landmark vertices, and executing, based on the plurality of distances from each vertex of the plurality of graph vertices to each vertex of the plurality of landmark vertices, including the additional vertex, a path query on the graph in the graph database to detect a second plurality of paths of shortest distance from a second source vertex of the plurality of graph vertices to a second target vertex of the plurality of graph vertices;

wherein a count of the first plurality of paths of shortest distance and a count of the second plurality of paths of shortest distance do not exceed a threshold.

15. The one or more non-transitory computer-readable media of claim 14 wherein the instructions further cause at least one of:

selecting the plurality of landmark vertices from a particular region of the graph, and increasing the plurality of landmark vertices based on latency of query(s) of the graph.

16. The one or more non-transitory computer-readable media of claim 14 wherein the instructions further cause:

adding, to a subset of said plurality of graph vertices that is initially empty, a vertex from said plurality of graph vertices;

iteratively selecting said plurality of landmark vertices from said plurality of graph vertices by adding, to said subset of said plurality of graph vertices and to said plurality of landmark vertices, a vertex of said plurality of graph vertices that is furthest from said subset of said plurality of graph vertices.

17. The one or more non-transitory computer-readable media of claim 14 wherein:

the plurality of landmark vertices consists of: a) a first landmark vertex that is furthest from a seed vertex of said plurality of graph vertices, b) a second landmark vertex that is furthest from the first landmark vertex and the seed vertex, and c) a subset of said plurality of landmark vertices without the first landmark vertex and the second landmark vertex;

the instructions further cause iteratively selecting said subset of the plurality of landmark vertices from said plurality of graph vertices by adding, to said subset of the plurality of landmark vertices, a vertex of said plurality of graph vertices that maximizes an arithmetic difference between: a) a sum of distances between all pairs of landmark vertices of the plurality of landmark vertices along paths that include said vertex, and b) a sum of distances between all pairs of landmark vertices of the plurality of landmark vertices.

18. The one or more non-transitory computer-readable media of claim 14 wherein said first K-A star search comprises triangulation based on said plurality of landmark vertices.

19. The one or more non-transitory computer-readable media of claim 18. wherein:

the instructions further cause receiving a query that specifies said first source vertex and said first target vertex;

said triangulation based on said plurality of landmark vertices occurs either:

before said first K-A star search, or after receiving said query that specifies said first source vertex and said first target vertex.

20. The one or more non-transitory computer-readable media of claim 14. wherein the instructions further cause:

operating a queue that contains a plurality of intermediate paths of the graph;

generating a new path that contains an intermediate path of the plurality of intermediate paths;

before the queue becomes empty, detecting that a last vertex of said intermediate path was expanded a threshold amount of times.

21. The one or more non-transitory computer-readable media of claim 18. wherein the first K-A star search comprises costing a partial path from said first source vertex to an intermediate vertex based on a distance from the intermediate vertex to said first target vertex through a landmark vertex of the plurality of landmark vertices.

* * * * *